US011240407B2

(12) United States Patent
Chen et al.

(10) Patent No.: US 11,240,407 B2
(45) Date of Patent: Feb. 1, 2022

(54) IMAGE PROCESSING DEVICE, IMAGE DISPLAY DEVICE, AND PROGRAM

(71) Applicant: EIZO Corporation, Ishikawa (JP)

(72) Inventors: Haifeng Chen, Ishikawa (JP); Reo Aoki, Ishikawa (JP); Masafumi Higashi, Ishikawa (JP)

(73) Assignee: EIZO Corporation, Hakusan (JP)

( * ) Notice: Subject to any disclaimer, the term of this patent is extended or adjusted under 35 U.S.C. 154(b) by 17 days.

(21) Appl. No.: 16/342,393

(22) PCT Filed: Oct. 31, 2016

(86) PCT No.: PCT/JP2016/082317
§ 371 (c)(1),
(2) Date: Apr. 16, 2019

(87) PCT Pub. No.: WO2018/078872
PCT Pub. Date: May 3, 2018

(65) Prior Publication Data
US 2020/0059574 A1    Feb. 20, 2020

(51) Int. Cl.
*H04N 5/217* (2011.01)
*H04N 5/14* (2006.01)

(52) U.S. Cl.
CPC ............ *H04N 5/217* (2013.01); *H04N 5/145* (2013.01)

(58) Field of Classification Search
CPC ................................ H04N 5/217; H04N 5/145
(Continued)

(56) References Cited

U.S. PATENT DOCUMENTS 6,784,927 B1    8/2004  Itokawa
2005/0280707 A1*  12/2005  Sablak ............... H04N 5/23261
                                                    348/155
(Continued)

FOREIGN PATENT DOCUMENTS

JP    H07-162864 A   6/1995
JP    H08-2090 B2    1/1996
(Continued)

OTHER PUBLICATIONS

International Search Report dated Jan. 17, 2017 in corresponding International Application No. PCT/JP2016/082317; 4 pages.
(Continued)

*Primary Examiner* — John W Miller
*Assistant Examiner* — Omer Khalid
(74) *Attorney, Agent, or Firm* — Maier & Maier, PLLC

(57) ABSTRACT

Provided is an image processing device, image display device, and program that allow an image captured by an imaging device not having a vibration suppression function or an image whose vibration has been suppressed incompletely to be displayed on a display device with the vibration suppressed. The image processing device includes a motion estimator configured to estimate the amount of motion of an object between a first image and a second image later than the first image and a motion compensator configured to perform a conversion process on the second image so that vibration of the object between the first image and the second image is suppressed, on the basis of the amount of motion of the object. The motion estimator has a first estimation mode in which the amount of motion of the object is estimated in a predetermined search area and a second estimation mode in which the amount of motion of the object is estimated in a larger area than the search area in the first estimation mode.

10 Claims, 13 Drawing Sheets

(58) Field of Classification Search
USPC .......................................... 348/607; 382/103
See application file for complete search history.

(56) References Cited

U.S. PATENT DOCUMENTS

| | | | |
|---|---|---|---|
| 2009/0238268 A1* | 9/2009 | Hsu ........................ | H04N 19/57 375/240.12 |
| 2012/0051662 A1 | 3/2012 | Naito | |
| 2012/0076207 A1* | 3/2012 | Schmit .................. | H04N 19/46 375/240.16 |
| 2013/0307937 A1* | 11/2013 | Kim ................... | H04N 5/23267 348/47 |
| 2014/0133703 A1* | 5/2014 | Dogra ..................... | G06T 7/238 382/103 |
| 2015/0178943 A1* | 6/2015 | Li .......................... | G06T 7/223 382/103 |
| 2016/0057349 A1 | 2/2016 | Miyazawa | |
| 2020/0036904 A1* | 1/2020 | Otsuki ................. | H04N 5/2351 |

FOREIGN PATENT DOCUMENTS

| | | |
|---|---|---|
| JP | H11-187303 A | 7/1999 |
| JP | 3395186 B2 | 4/2003 |
| JP | 2007-006111 A | 1/2007 |
| JP | 2012-049603 A | 3/2012 |
| JP | 2016-046580 A | 4/2016 |

OTHER PUBLICATIONS

Office Action dated Apr. 28, 2020 in corresponding Japanese Application No. 2018-547092; 8 pages including English-language translation.

Office Action dated Apr. 29, 2020 in corresponding European Application No. 16 919 991.6; 9 pages.

Extended European Search Report dated Oct. 4, 2019, including the Supplementary European Search Report and the European Search Opinion, in connection with corresponding EP Application No. 16919991.6 (6 pgs ).

\* cited by examiner

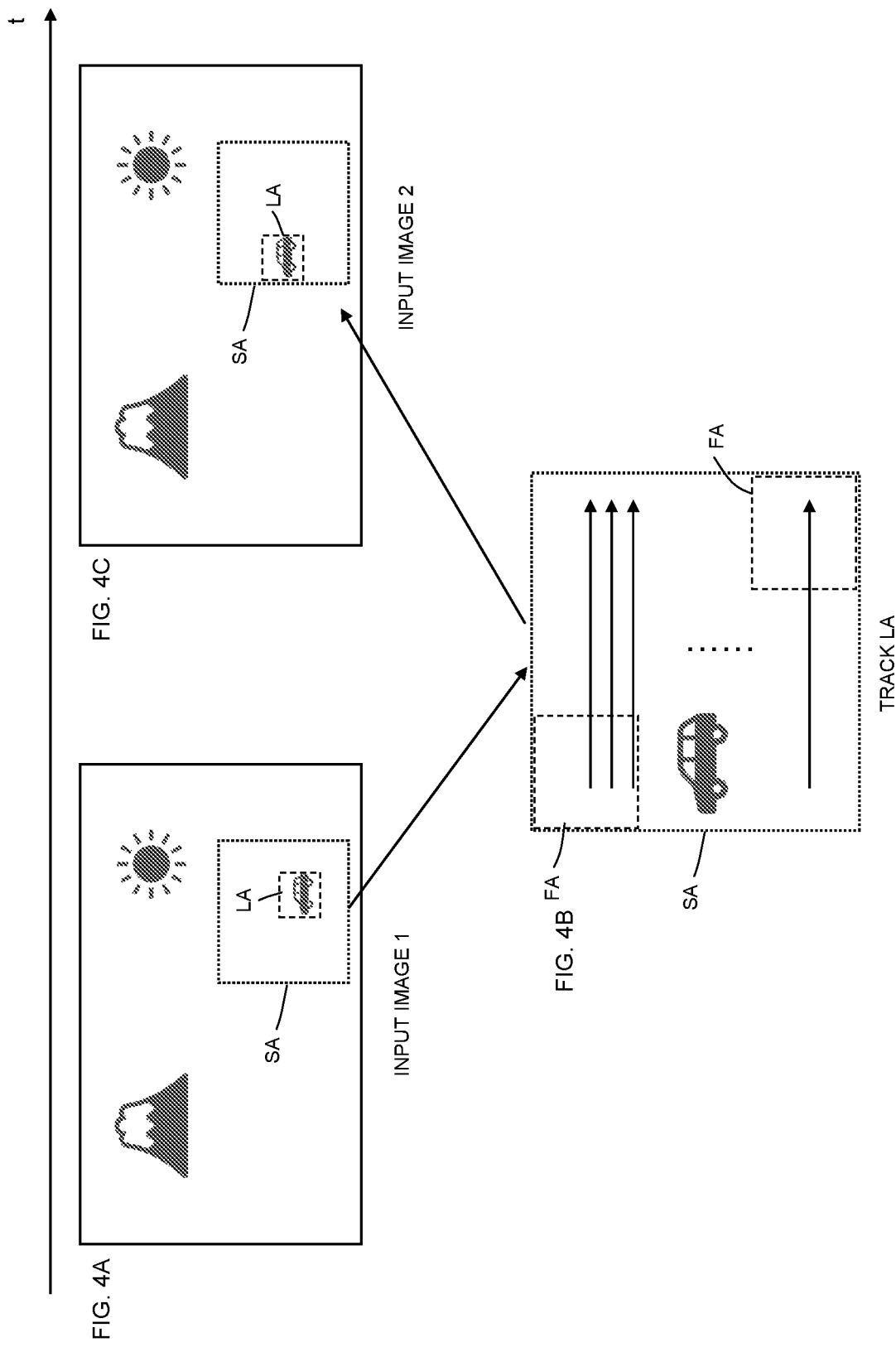

LOCAL MOTION ESTIMATION MODE BASIC CONCEPT DIAGRAM

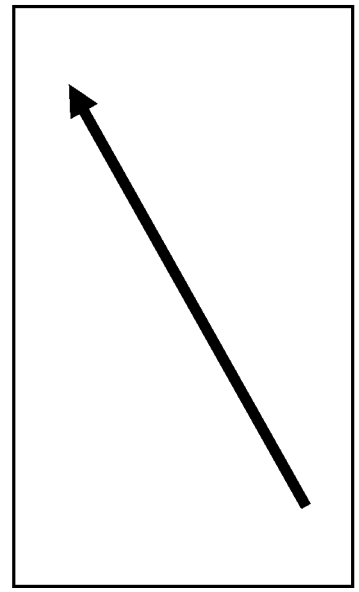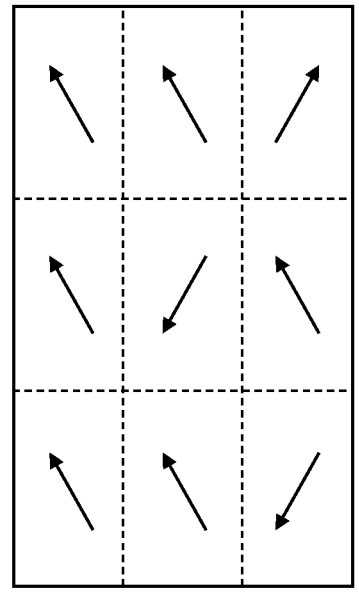
FIG. 9

FIG. 11 SECOND EMBODIMENT

IMAGE PROCESSING DEVICE, IMAGE DISPLAY DEVICE, AND PROGRAM

TECHNICAL FIELD

The present invention relates to an image processing device, image display device, and program that suppress the vibration of an image.

BACKGROUND ART

To suppress the vibration of an image, various image processing methods have been proposed.

To provide an imaging device that is able to prevent a reduction in the performance of a blur correction mechanism and to easily track a subject even if the subject moves out of the angle of view, Patent Literature 1 discloses an imaging device that includes an image sensor configured to capture subject light guided by an imaging optical system and to output a captured image and an optical correction system (e.g., a correction lens) for correcting an image blur caused by vibration applied to the device, wherein the imaging device tracks the subject in the captured image by selecting one of an optical tracking mode in which the subject is tracked by driving the optical correction system and an electronic tracking mode in which the subject is tracked by cutting out the area of the subject from the captured image, in accordance with whether a predetermined criterion is satisfied.

CITATION LIST

Patent Literature

[Patent Literature 1] Japanese Unexamined Patent Application Publication No. 2016-46580

SUMMARY OF THE INVENTION

Technical Problem

According to the imaging device of Patent Literature 1, the vibration (blur) of an image can be suppressed by adjusting the zoom position of the correction lens. In the case where an image captured by an imaging device not having a vibration suppression function is displayed on a display device, the vibration of the displayed image remains unsuppressed. Also, even an imaging device having such vibration suppression function may not be able to completely suppress the vibration of an image. So, when an image in which vibration has not been completely suppressed is displayed on the display device, the vibration of the displayed image remains.

The present invention has been made in view of the foregoing, and an object thereof is to provide an image processing device, image display device, and program that allow an image captured by an imaging device not having a vibration suppression function or an image whose vibration has been suppressed incompletely to be displayed on a display device with the vibration suppressed.

Solution to Problem

The present invention provides an image processing device including a motion estimator configured to estimate the amount of motion of an object between a first image and a second image later than the first image and a motion compensator configured to perform a conversion process on the second image so that vibration of the object between the first image and the second image is suppressed, on the basis of the amount of motion of the object. The motion estimator has a first estimation mode in which the amount of motion of the object is estimated in a predetermined search area and a second estimation mode in which the amount of motion of the object is estimated in a larger area than the search area in the first estimation mode.

According to the present invention, the motion estimator configured to estimate the amount of motion of the object between the first image and the second image later than the first image has the first estimation mode in which the amount of motion of the object is estimated in the predetermined search area and the second estimation mode in which the amount of motion of the object is estimated on the basis of the larger area than the search area in the first estimation mode. For this reason, images are displayed in the first estimation mode, in which calculation is small in amount, and when it is difficult to estimate the amount of motion of the object in the first estimation mode, the first estimation mode is switched to the second estimation mode. Thus, the vibration of the image can be efficiently suppressed on the display device side without significantly consuming the calculation resources. As a result, an image captured by an imaging device not having a vibration suppression function or an image whose vibration has been suppressed incompletely can be displayed on a display device with the vibration suppressed.

Various embodiments of the present invention are described below. The embodiments below can be combined with each other.

Preferably, when a predetermined criterion is satisfied, the motion compensator performs the conversion process on the basis of the amount of motion estimated in the second estimation mode, and when the predetermined criterion is not satisfied, the motion compensator performs the conversion process on the basis of the amount of motion estimated in the first estimation mode.

Preferably, in the first estimation mode, the motion estimator defines, as an estimation error, a value calculated on the basis of a difference in luminance between the object included in the first image and a predetermined area included in the second image, and the predetermined criterion is that the estimation error exceeds a predetermined value, or that the estimation error exceeds a predetermined multiple of an average value, or both.

Preferably, the second estimation mode is a global motion estimation mode in which the amount of motion of the object is estimated from the entire first and second images.

Preferably, in the second estimation mode, the amount of motion of the object is estimated in a new search area obtained by expanding a size of the search area in the first estimation mode.

Preferably, the motion estimator estimates the amount of motion of the object using pattern matching or a feature vector.

Preferably, the image processing device further includes an area setter configured to set an area corresponding to the object in the first estimation mode.

Preferably, the motion compensator performs the conversion process on the second image so that the area set by the area setter is located in an approximate center of a display surface on which the first and second images are displayed.

Preferably, the image processing device further includes a mode switch configured to switch between the first estimation mode and the second estimation mode.

Preferably, when the predetermined criterion is not satisfied, the mode switch switches the second estimation mode to the first estimation mode.

Preferably, an image display device including any one of the image processing devices is provided.

Preferably, there is provided an image processing program for causing a computer to function as a motion estimator configured to estimate the amount of motion of an object between a first image and a second image later than the first image and a motion compensator configured to perform a conversion process on the second image so that vibration of the object between the first image and the second image is suppressed, on the basis of the amount of motion of the object. The motion estimator has a first estimation mode in which the amount of motion of the object is estimated in a predetermined search area and a second estimation mode in which the amount of motion of the object is estimated in a larger area than the search area in the first estimation mode.

BRIEF DESCRIPTION OF DRAWINGS

FIGS. 4A to 4C are conceptual diagrams showing an aspect in which a local area tracking unit 4 tracks a local area LA, in which FIG. 4A shows an input image 1; FIG. 4B shows an aspect of tracking of the local area LA in a search area SA; and FIG. 4C shows an input image 2.

FIG. 9 is a conceptual diagram showing the global motion estimation mode, in which arrows represent the movement directions of divided areas obtained by dividing an image; and the movement directions of six divided areas of the nine divided areas are an upper-right direction and therefore the entire element is estimated to be moving in the upper-right direction.

DESCRIPTION OF EMBODIMENTS

Now, embodiments of the present invention will be described with reference to the drawings. Various features described in the embodiments below can be combined with each other.

First Embodiment

Referring now to FIGS. 1 to 10, an image processing device 1 according to a first embodiment of the present invention will be described.

Vibration of Object in Image

As shown in FIGS. 1A to 1C, captured images may vibrate due to camera shake or the like, resulting in vertical or horizontal displacement of an object in the images. As used herein, the term "images" refers to multiple images arranged in chronological order and, in particular, moving images.

Figure 1:
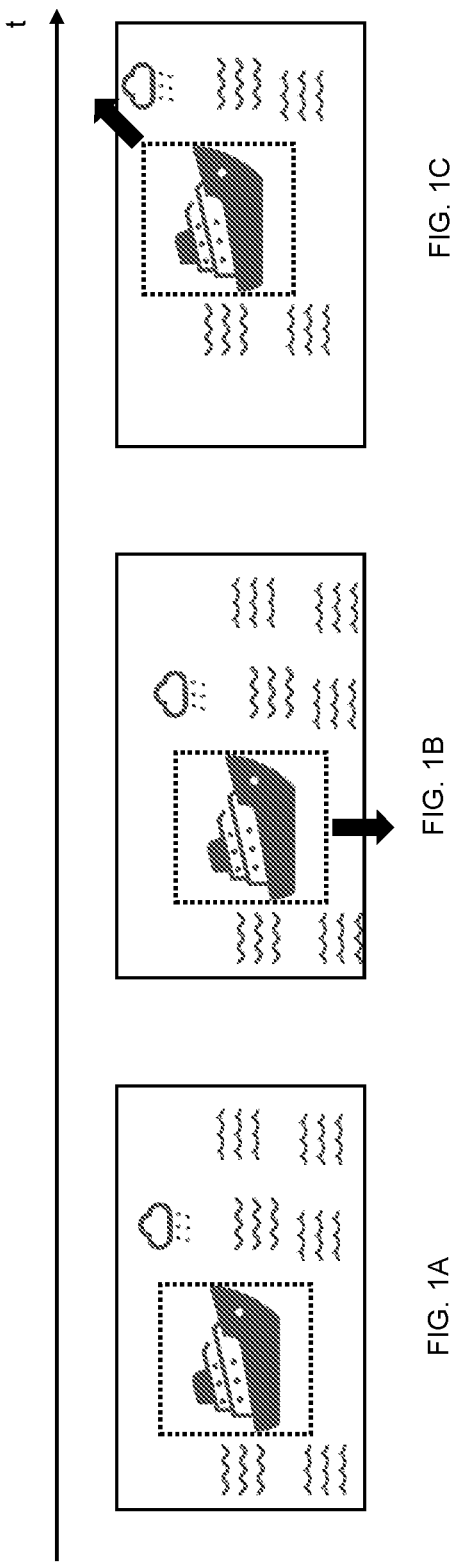
FIGS. 1A to 1C are conceptual drawings showing the vibration of an image, in which images are inputted in the order of 1A, 1B, and 1C; and an arrow represents time t (the same applies to the following drawings).

For example, an image shown in FIG. 1A is displaced downward in the subsequent frame shown in FIG. 1B. Also, the image shown in FIG. 1B is displaced in an upper-right direction in the subsequent frame shown in FIG. 1C. As seen above, an object (a broken-line area in FIG. 1) vibrates between a first image and a second image later than the first image.

To suppress such vibration, the image processing device 1 according to the first embodiment is used. Thus, the image is displayed on an image display device with the vibration suppressed.

Image Processing Device 1

Figure 2:
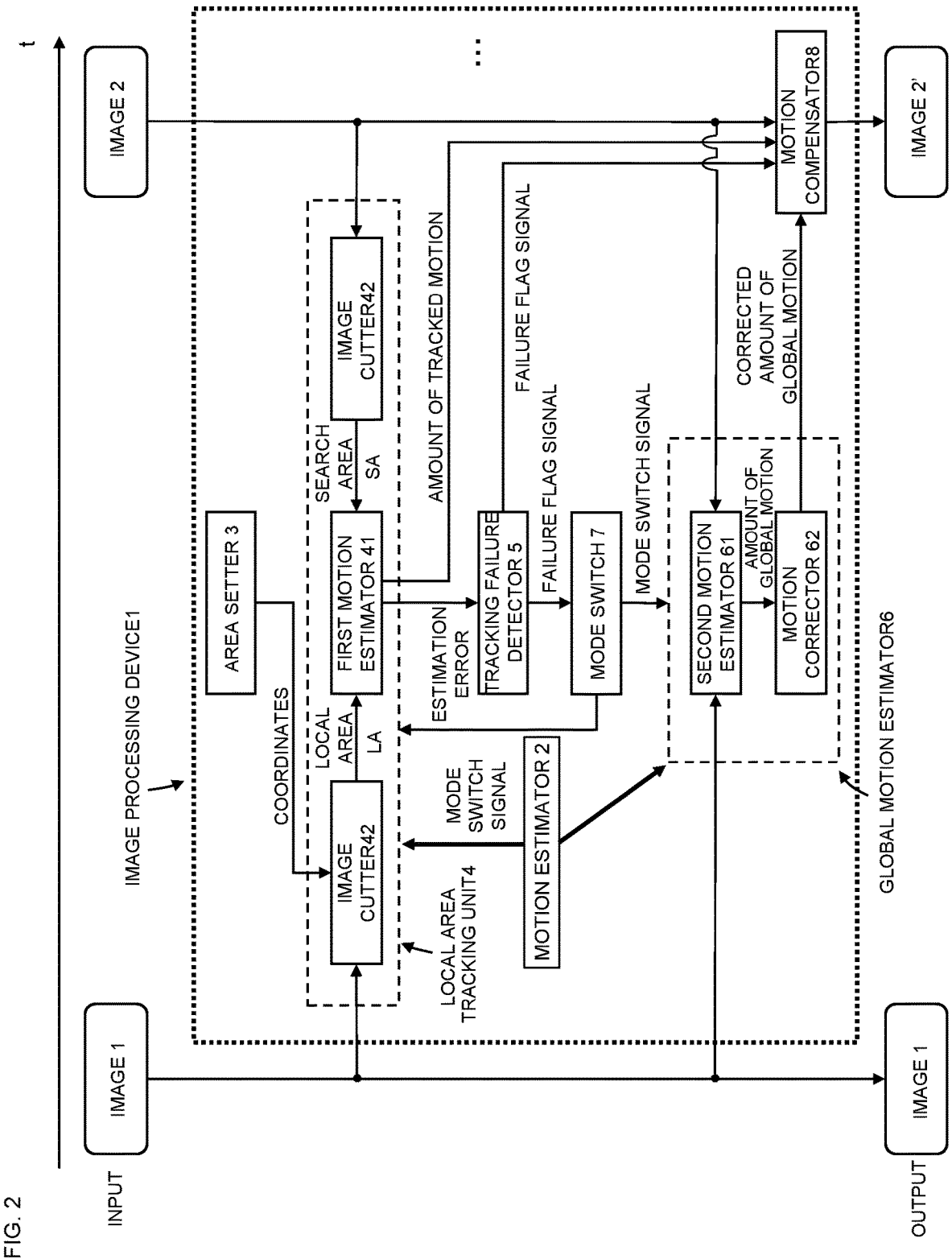
FIG. 2 is a diagram chronologically showing the functional configuration of an image processing device 1 according to a first embodiment of the present invention and images inputted to the image processing device 1.

Referring now to FIGS. 2 to 10, the configuration and process of the image processing device 1 will be described. As shown in FIG. 2, the image processing device 1 according to the first embodiment includes a motion estimator 2 that estimates the amount of motion of an object between a first image and a second image later than the first image and a motion compensator 8 that performs a conversion process on the second image on the basis of the amount of motion of the object to suppress the vibration of the object between the first and second images. The motion estimator 2 has a first estimation mode in which the amount of motion of the object is estimated in a predetermined search area SA and a second estimation mode in which the amount of motion of the object is estimated on the basis of a larger area than the search area SA in the first estimation mode. When a predetermined criterion is satisfied, the motion compensator 8 performs the conversion process on the basis of the amount of motion estimated in the second estimation mode; when the predetermined criterion is not satisfied, the motion compensator 8 performs the conversion process on the basis of the amount of motion estimated in the first estimation mode.

The first embodiment will be described using consecutive two images, an image 1 and an image 2, as examples of the first image and the second image later than the first image.

The image processing device 1 includes the motion estimator 2, an area setter 3, a tracking failure detector 5, a mode switch 7, and the motion compensator 8. The motion estimator 2 includes a local area tracking unit 4 and a global motion estimator 6. The local area tracking unit 4 includes a first motion estimator 41 and an image cutter 42. The global motion estimator 6 includes a second motion estimator 61 and a motion corrector 62. These functions may be implemented by software or hardware. When implementing the functions by software, a CPU may be caused to execute a program. The program may be stored in built-in memory or a computer-readable non-transitory storage medium. The program may also be stored in external memory and then read so that the functions are implemented by so-called cloud computing. When implementing the functions by hardware, ASIC, FPGA, DRP, or the like may be used.

The area setter 3 sets an area corresponding to an object in a local motion estimation mode, which is an example of a first estimation mode. In the first embodiment, the area corresponding to the object is referred to as a local area LA (to be discussed later with reference to FIG. 4). In the local motion estimation mode, the local area LA is tracked by estimating the amount of motion of the object between the first image and the later second image.

The motion estimator 2 estimates the amount of motion of the object between the first image and the later second image. The first and second images may be consecutive images included in multiple images or may be two non-consecutive images.

The local area tracking unit 4 tracks the local area LA in the local motion estimation mode. The local motion estimation mode is a mode in which the amount of motion of the object is estimated in the predetermined search area SA. This mode can save the calculation resources compared to when estimating the amount of motion of the object using the entire first and second images. Also, the local motion estimation mode is a mode in which the object can be tracked in the search area SA, and therefore allows for accurate estimation of the motion of the object compared to when estimating the amount of motion of the object using the entire first and second images.

The image cutter 42 cuts out parts of the first and second images and outputs the cut-out image parts to the first motion estimator 41. The image cutter 42 determines the range of the part of the image 1 to be cut out, on the basis of coordinates received from the area setter 3.

The first motion estimator 41 estimates the motion of the object in the search areas SA of the first and second images using the image parts received from the image cutter 42. In the first embodiment, the amount of motion of the object estimated by the first motion estimator 41 is referred to as an amount of tracked motion. The first motion estimator 41 then outputs the amount of tracked motion to the motion compensator 8. The first motion estimator 41 also outputs, to the tracking failure detector 5, an estimation error (to be discussed later with reference to FIG. 4) indicating a value calculated on the basis of the difference in luminance between the object included in the first image and a predetermined range included in the second image.

The global motion estimator 6 estimates the motion of the object in a global motion estimation mode, which is an example of a second estimation mode. The global motion estimation mode is a mode in which the amount of motion of the object is estimated from the entire first and second images. For this reason, the global motion estimation mode requires a larger amount of calculation than the local motion estimation mode, while it allows for estimation of the motion of the object that cannot be coped with in the local motion estimation mode. In the global motion estimation mode, the term "object" refers to the entire image.

The second motion estimator 61 estimates the amount of motion of the object using the entire first and later second images. In the first embodiment, the amount of motion of the object estimated by the second motion estimator 61 is referred to as an amount of global motion. The second motion estimator 61 then outputs the amount of global motion to the motion corrector 62.

The motion corrector 62 calculates an amount of correction used when performing a conversion process on the second image, on the basis of the amount of global motion received from the second motion estimator 61. Such correction will be described later with reference to FIG. 10. The motion corrector 62 then outputs the corrected amount of global motion to the motion compensator 8.

The tracking failure detector 5 detects that the first motion estimator 41 has failed to track the local area LA.

The mode switch 7 switches between the local motion estimation mode and the global motion estimation mode, which is an example of the second estimation mode. When switching between the local motion estimation mode and global motion estimation mode, the mode switch 7 outputs a mode switch signal to the local area tracking unit 4 and global motion estimator 6. Thus, the mode of the image processing device 1 is switched.

The motion compensator 8 performs a conversion process on the second image on the basis of the amount of motion of the object to suppress the vibration of the object between the first and second images. When the predetermined criterion is satisfied, the motion compensator 8 performs the conversion process on the basis of the amount of motion estimated in the second estimation mode; when the predetermined criterion is not satisfied, it performs the conversion process on the basis of the amount of motion estimated in the first estimation mode. Thus, the input image 2 is converted into an image 2', which is then outputted as an output image. As a result, the vibration of the object between the first and second images is suppressed.

Flowchart

Next, referring to FIG. 3, the process flow of the image processing device 1 will be described.

S1: Set Local Area

First, in S1, the area setter 3 sets a local area LA. The image processing device 1 is previously placed in the local motion estimation mode.

The setting of the local area LA by the area setter 3 will be described with reference to FIG. 4. In the first embodiment, as shown in FIG. 4A, an area surrounding an object (vehicle) in an image is defined as the local area LA. When setting the local area LA, the area setter 3 receives coordinates (x,y) identifying the position of the object. The area setter 3 then sets the local area LA by generating coordinates indicating an area having a predetermined size, around the received coordinates. The area setter 3 may have any configuration. For example, it may be an input device, such as a keyboard, touchscreen, voice input device, or gesture recognition device. Note that the area setter 3 need not set the local area LA as described above. For example, the area setter 3 may use, as the local area LA, an area obtained by previously dividing an image into multiple areas and combining a predetermined number of areas around an area including the received coordinates. For example, the area setter 3 may use, as the local area LA, a total of nine areas obtained by expanding an area including the received coordinates vertically and horizontally by two areas. Also, the coordinates of an object detected using any object detection technology may be automatically inputted to the area setter 3.

The area setter 3 then outputs the coordinates indicating the local area LA to the image cutter 42 shown in FIG. 2.

S2: Track Local Area

Then, in S2, the local area tracking unit 4 tracks the local area LA in the search area SA.

A technique by which the local area tracking unit 4 tracks the local area LA will be described with reference to FIGS. 4A to 4C. Assume that the input image 1 shown in FIG. 4A has been changed to the input image 2 shown in FIG. 4C in the subsequent frame. In the input images 1, 2, the local area LA is positioned in the search area SA. The search area SA is a range in which the local area LA is tracked. In other words, in the local motion estimation mode, the local area LA is tracked in the search area SA. The position and size of the search area SA may be set arbitrarily. For example, a predetermined area around the local area LA may be previously set as the search area SA.

The local area tracking unit 4 estimates the local area LA from the image 2 by moving a fitting area FA in the search area SA as shown in FIG. 4B.

Specifically, the image cutter 42 shown in FIG. 2 cuts out the local area LA from the input image 1 and the search area SA from the input image 2 on the basis of the received coordinates. The image cutter 42 then outputs the cut-out images to the first motion estimator 41.

As shown in FIG. 4B, the first motion estimator 41 generates the fitting area FA having the same size as the local area LA in the search area SA. The first motion estimator 41 then compares the difference in luminance between the fitting area FA and the local area LA included the input image 1. Specifically, the first motion estimator 41 obtains relative positions in the fitting area FA, of pixels included in the fitting area FA and relative positions in the local area LA, of pixels included in the local area LA. The first motion estimator 41 then calculates the differences in luminance between pixels whose relative positions correspond to each other, with respect to all pixels included the fitting area FA and local area LA and sums up the differences. For example, this calculation is performed using "$\Sigma|Y_0-Y_1|$" where $\Sigma$ represents the sum of all pixels in the respective areas; Y0 represents the luminance of a pixel included in the local area LA; and Y1 represents the luminance of a pixel included in the fitting area FA. In the first embodiment, the sum of the differences corresponds to an estimation error. Instead of defining the sum of the differences itself as an estimation error, a value obtained by multiplying the sum of the differences by a predetermined factor may be defined as an estimation error. That is, in the first estimation mode, a value calculated on the basis of the difference in luminance between the object (the local area LA) included in the first image and the predetermined area (the fitting area FA in the search area SA) included in the second image can be defined as an estimation error.

The first motion estimator 41 sequentially performs this calculation while shifting the fitting area FA in the search area SA on a pixel-by-pixel basis. Specifically, in the first embodiment, the first motion estimator 41 first sets the fitting area FA on the upper-left edge of the search area SA and then calculates $\Sigma|Y_0-Y_1|$ while shifting the fitting area FA on a pixel-by-pixel basis in the right direction of the figure. When the fitting area FA reaches the upper-right edge of the search area SA, the first motion estimator 41 returns the fitting area FA to the initial position and then shifts it by one pixel in the downward direction of the figure, that is, sets it in a lower position than the initial position by one line. The first motion estimator 41 then repeatedly performs this calculation until the fitting area FA reaches the lower-right edge of the search area SA.

The first motion estimator 41 then makes a comparison among $\Sigma|Y_0-Y_1|$ of all positions and identifies the coordinates of a fitting area FA having the smallest value. The first motion estimator 41 then estimates an area represented by the coordinates, as an area corresponding to the local area LA included in the input image 1. This is because the area having the smallest luminance difference is most likely to correspond to the local area LA included in the input image 1. Note that when the local area LA does not change between the input images 1 and 2 at all, the estimation error is 0.

In this way, the local area tracking unit 4 tracks the movement of the local area LA.

S3: Detect Failure Flag

Then, in S3, the tracking failure detector 5 determines whether a failure flag has been detected. A failure flag is detected on the basis of the predetermined criterion.

For example, when the local area LA makes a large movement between the two images or when the luminance of the local area LA changes significantly therebetween, the first motion estimator 41 may have difficulty in tracking the local area LA. For this reason, in the first embodiment, the predetermined criterion is previously set as a criterion indicating that tracking is difficult, and when this criterion is satisfied (that is, when the first motion estimator 41 has difficulty in tracking the local area LA), the tracking failure detector 5 detects a failure flag and generates a failure flag signal indicating that tracking is difficult.

Figure 5A:
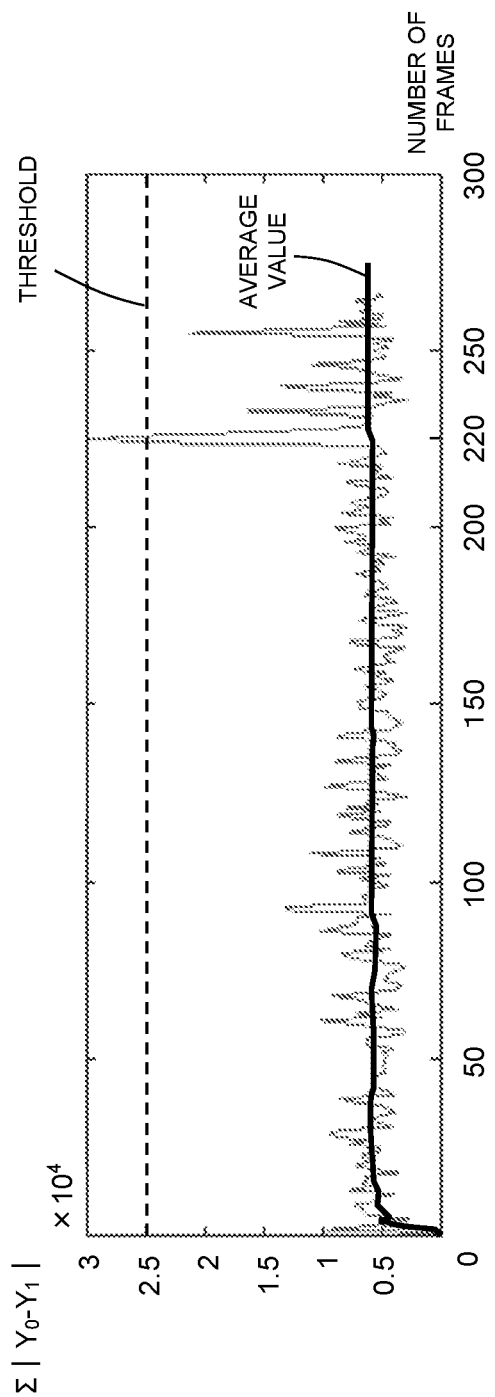
FIGS. 5A and 5B are graphs showing a predetermined criterion.

The predetermined criterion will be described below with reference to FIG. 5. FIG. 5A is a graph obtained by plotting the estimation error ($\Sigma|Y_0-Y_1|$) of the local area LA on the vertical axis and the number of image frames on the horizontal axis. Note that FIG. 5 shows a case in which the number of frames is 300, that is, a case in which images 1 to 300 have been inputted as input images.

In the first embodiment, the predetermined criterion is that "the estimation error exceeds a predetermined value" or that "the estimation error exceeds a predetermined multiple of the average value." More specifically, the predetermined criterion is that "the estimation error exceeds the predetermined value and exceeds the predetermined multiple of the average value." As used herein, the term "predetermined value" refers to a threshold (absolute value) and tracking of the local area LA will become difficult when the estimation error exceeds this value. The predetermined value may be any value. In the first embodiment, the threshold is, for example, 25,000. The term "average value" refers to the average of the amounts of motion of multiple images arranged in chronological order. In FIG. 5A, a thick line in the graph represents the average amount of motion, and the value is about 5,000. The term "predetermined multiple of the average amount of motion" refers to a coefficient arbitrarily set by the user and is, for example, 3 in the first embodiment.

Figure 5B:
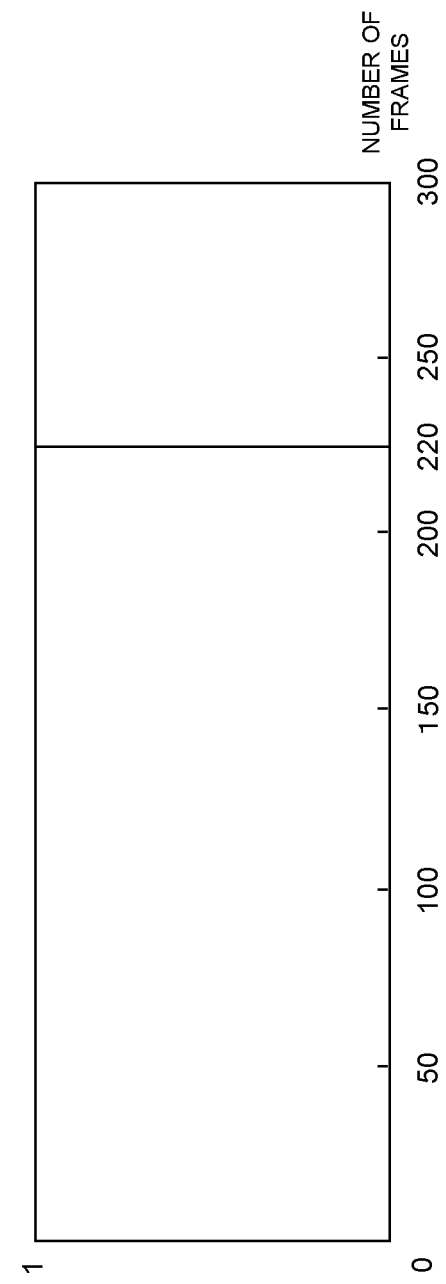

Specifically, in the first embodiment, when the estimation error exceeds 25,000 and the estimation error exceeds 15,000, it is determined that tracking of the local area LA is difficult. In the example of FIG. 5, this criterion is satisfied when the frame number is 220. Also, as shown in FIG. 5B, when the frame number is 220, the tracking failure detector 5 generates a failure flag signal. Then, as shown in FIG. 2, the tracking failure detector 5 outputs the failure flag signal to the mode switch 7 and motion compensator 8.

When the determination result in S3 is "No", that is, when no failure flag has been detected, the process proceeds to S4.

S4: Output Amount of Motion

Then, in S4, as shown in FIG. 2, the local area tracking unit 4 outputs, to the motion compensator 8, the amount of motion (the amount of tracked motion) to perform motion compensation in the subsequent S5.

S5: Motion Compensation

Then, in S5, the motion compensator 8 performs a compensation process.

The processes in S4 and S5, that is, the local motion estimation mode will be described below with reference to FIGS. 6 and 7.

Local Motion Estimation Mode

Figure 6:
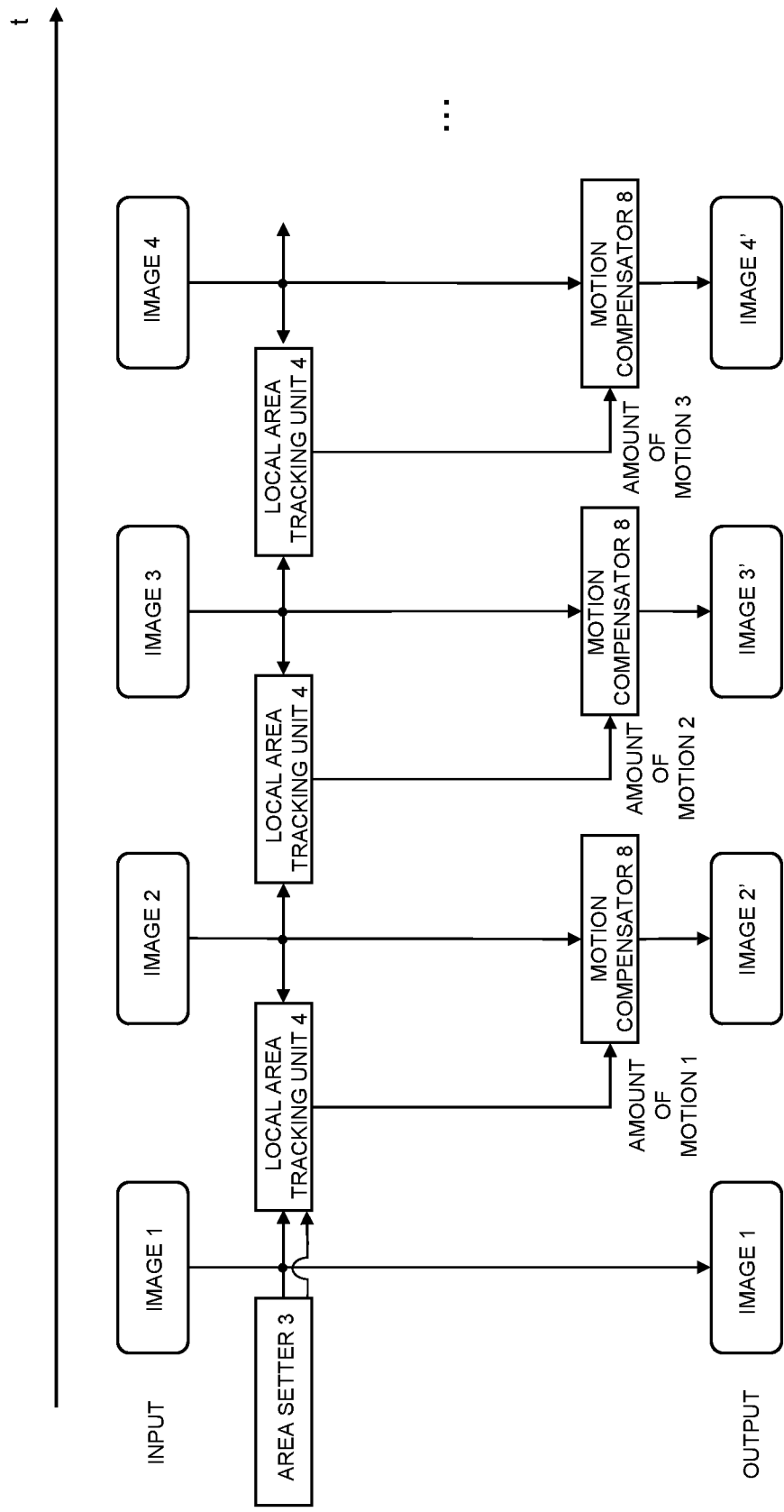
FIG. 6 is a diagram showing the basic concept of a local motion estimation mode (an example of a first estimation mode) according to one embodiment of the present invention.
Figure 7:
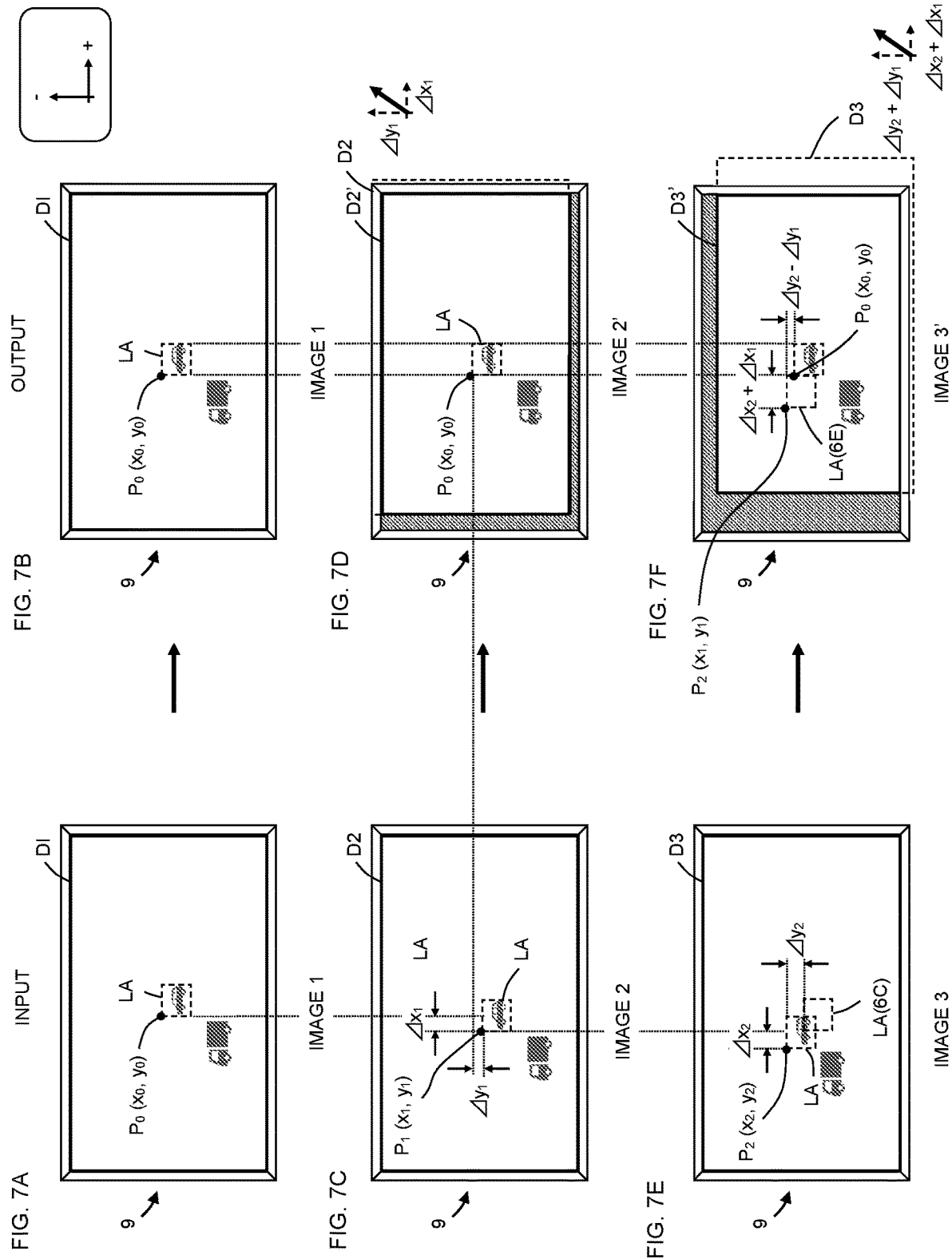
FIGS. 7A to 7F are conceptual diagrams showing an aspect in which a motion compensator 8 compensates for the position of an image in the local motion estimation mode so that the local area LA is displayed in the approximate center of the display surface, in which a hatched portion represents an area where no image is displayed.

FIG. 6 is a diagram showing processing of various types of data in the local motion estimation mode. In FIG. 6, image data inputted to or outputted from the area setter 3, local area tracking unit 4, and motion compensator 8 is arranged in chronological order.

Figure 3:
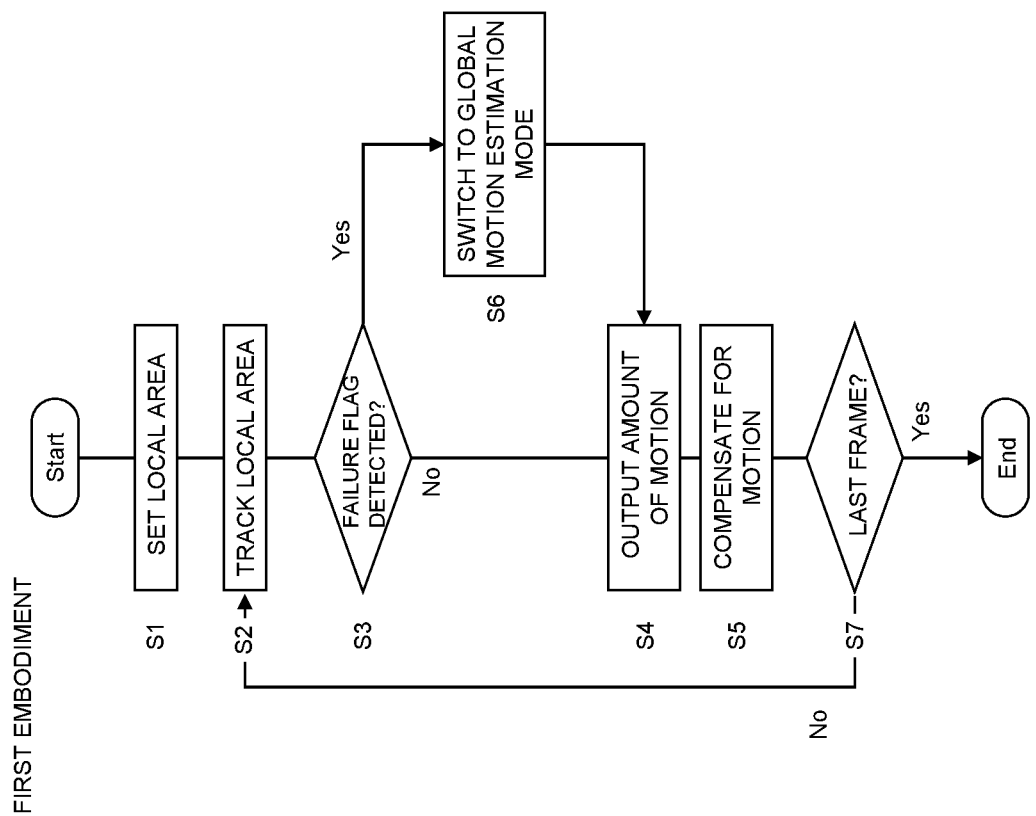
FIG. 3 is a flowchart showing an example of a process performed by the image processing apparatus 1 according to the first embodiment of the present invention.

First, the area setter 3 generates the coordinates of the local area LA by performing the process of S1 in FIG. 3.

Since the input image 1 is only one input image, tracking of the local area LA is difficult. Accordingly, the image 1 is outputted as an output image as it is.

Then, when the image 2, which is the input image of the subsequent frame, is inputted, data indicating the image 2 is outputted to the local area tracking unit 4 along with data indicating the image 1. Then, the local area tracking unit 4 estimates the amount of motion between the image 1 and image 2 (the amount of motion 1) and outputs the amount of motion 1 and the data indicating the image 2 to the motion compensator 8. The motion compensator 8 generates an image 2' by performing a conversion process on the image 2 on the basis of the amount of motion 1 and outputs the image 2' as an output signal subsequent to the image 1.

The conversion process based on the amount of motion will be described below with reference to FIG. 7. FIGS. 7A to 7F show states in which an image is displayed on an image display device 9, in which FIGS. 7A, 7C, and 7E show input images; and FIGS. 7B, 7D, and 7F show output images. In these figures, D1 to D3 represent the display ranges of images 1 to 3, and D2' and D3' represent the display ranges of images 2' and 3'.

In the first embodiment, the motion compensator 8 compensates for the position of the image so that the local area LA is displayed in the approximate center of the display surface on which the image is displayed. Specifically, the motion compensator 8 moves the image 1 on the basis of the coordinates set by the area setter 3 and the coordinates of the approximate center of the display surface. In the first embodiment, to simplify the description, a case in which the coordinates of the approximate center of the display surface are previously inputted to the area setter 3 will be described. That is, in FIG. 7A, the local area LA is previously set in the approximate center of the display surface.

As shown in FIGS. 7A and 7B, when the image 1 is inputted, the image 1 is outputted as it is. An upper-left position P0 (x0,y0) of the local area LA identifies the position of the local area LA included in the image 1, and the compensation process is performed using the position P0 as a reference.

Next, as shown in FIG. 7C, assume that the local area LA included in the image 1 has been moved in the image 2 by ($\Delta$x1,$\Delta$y1). This amount of movement corresponds to the amount of tracked motion calculated when the local area tracking unit 4 tracks the local area LA. The local area tracking unit 4 stores the upper-left position P1 (x1,y1) of the moved local area LA. Also, as shown in FIG. 6, the local area tracking unit 4 outputs the amount of motion 1 ($\Delta$x1, $\Delta$y1) to the motion compensator 8.

To suppress the vibration of the local area LA, the motion compensator 8 moves the image 2 along with D2 by the amount of motion 1 ($\Delta$x1,$\Delta$y1). In the first embodiment, the right direction of FIG. 7 is defined as a positive x-axis direction, and the vertical direction is defined as a positive y-axis direction. This process is performed using P0 (x0,y0) and P1 (x1,y1). Specifically, this process is performed by rendering the entire image 2 such that the coordinates (x1,y1) of P1 match the coordinates (x0,y0) of P0. In other words, the motion compensator 8 suppresses the vibration of the local area LA by moving the image 2 by the opposite phase of the amount of tracked motion. The above process is the conversion process. Due to this conversion process, the image 2' is generated and outputted as an output image. Since the image 2 is moved along with D2, D2', which is the range displayed on the image display device 9, of the moved entire image, is smaller than D2. Note that a hatched portion in FIG. 7D represents an area in which no image is displayed. Instead of being hatched, this area may be displayed in black or mosaic, or any image, any scaled-down image, or the like may be displayed therein.

If it is not desired to generate an area where no image is displayed as seen in FIG. 7D, such area (the hatched portion) can be eliminated by enlarging the range D2' and moving the local area LA to the approximate center of the display surface.

Referring back to FIG. 6, the description of processing of various types of data in the local motion estimation mode will be continued. When an image 3 is inputted, data indicating the image 3 is outputted to the local area tracking unit 4. While, for the convenience of description, FIG. 6 shows that the data indicating the image 2 and the amount of motion 1 are outputted to the local area tracking unit 4, these pieces of data are actually already held by the local area tracking unit 4.

The local area tracking unit 4 calculates the amount of motion 2 between the image 2 and image 3. In the first embodiment, as shown in FIG. 7E, the amount of motion 2 is calculated as ($\Delta$x2,$\Delta$y2) from the upper-left position P2 (x2,y2) of the local area LA included in the image 3 and P1 (x1,y1) in the image 2. In an example of FIG. 7E, $\Delta$y2 is a negative value. The coordinates (x2,y2) of P2 are uniquely identified using P0 (x0,y0) and P1 (x1,y1). As shown in FIG. 6, the local area tracking unit 4 outputs the amount of motion 2 ($\Delta$x2,$\Delta$y2) to the motion compensator 8.

As shown in FIG. 7F, the motion compensator 8 moves the image 3 along with D3 by the amount of motion 1 plus the amount of motion 2 ($\Delta$x2+$\Delta$x1,$\Delta$y2+$\Delta$y1). This process is performed using P0 (x0,y0) and P2 (x2,y2). Specifically, this process is performed by rendering the entire image 3 such that the coordinates (x2,y2) of P2 match the coordinates (x0,y0) of P0. Thus, the motion compensator 8 generates an image 3' and outputs the image 3' as an output image subsequent to the image 2'.

Then, when an image 4 is inputted, a process similar to those with respect to the images 2 and 3 is repeated. This process is performed each time one image is inputted until the input image of the last frame is inputted.

In the local motion estimation mode, the subsequent image is converted in accordance with P0 (x0,y0). For this reason, instead of calculating the amount of motion 2 between the image 2 and image 3, the amount of motion between the images 1 and image 3 may be directly calculated by comparing the image 1 and image 3. However, the local area LA is tracked with higher accuracy by comparing the image 2 and image 3 than by comparing the image 1 and image 3. The reason is that the luminance in the local area LA included in actual images 1, 2, 3, and the like changes from moment to moment and a smaller estimation error ($\Sigma|Y_0-Y_1|$) is obtained by comparing with an image as recent as possible.

As seen above, in the local motion estimation mode, the local area LA can be tracked in the search area SA using pattern matching.

Referring back to FIG. 3, the description of the flow will be continued.

When the determination result in S3 is "Yes", that is, a failure flag is detected, the tracking failure detector 5 outputs a failure flag signal to the mode switch 7 and motion compensator 8, and the process proceeds to S6.

In S6, the mode switch 7 outputs a mode switch signal to the local area tracking unit 4 and global motion estimator 6 and switches the image processing device 1 from the local motion estimation mode to the global motion estimation mode. Then, the amount of motion calculated in the global motion estimation mode is outputted to the motion compensator 8, and the process proceeds to S4 and S5 as in the local motion estimation mode.

Figure 8:
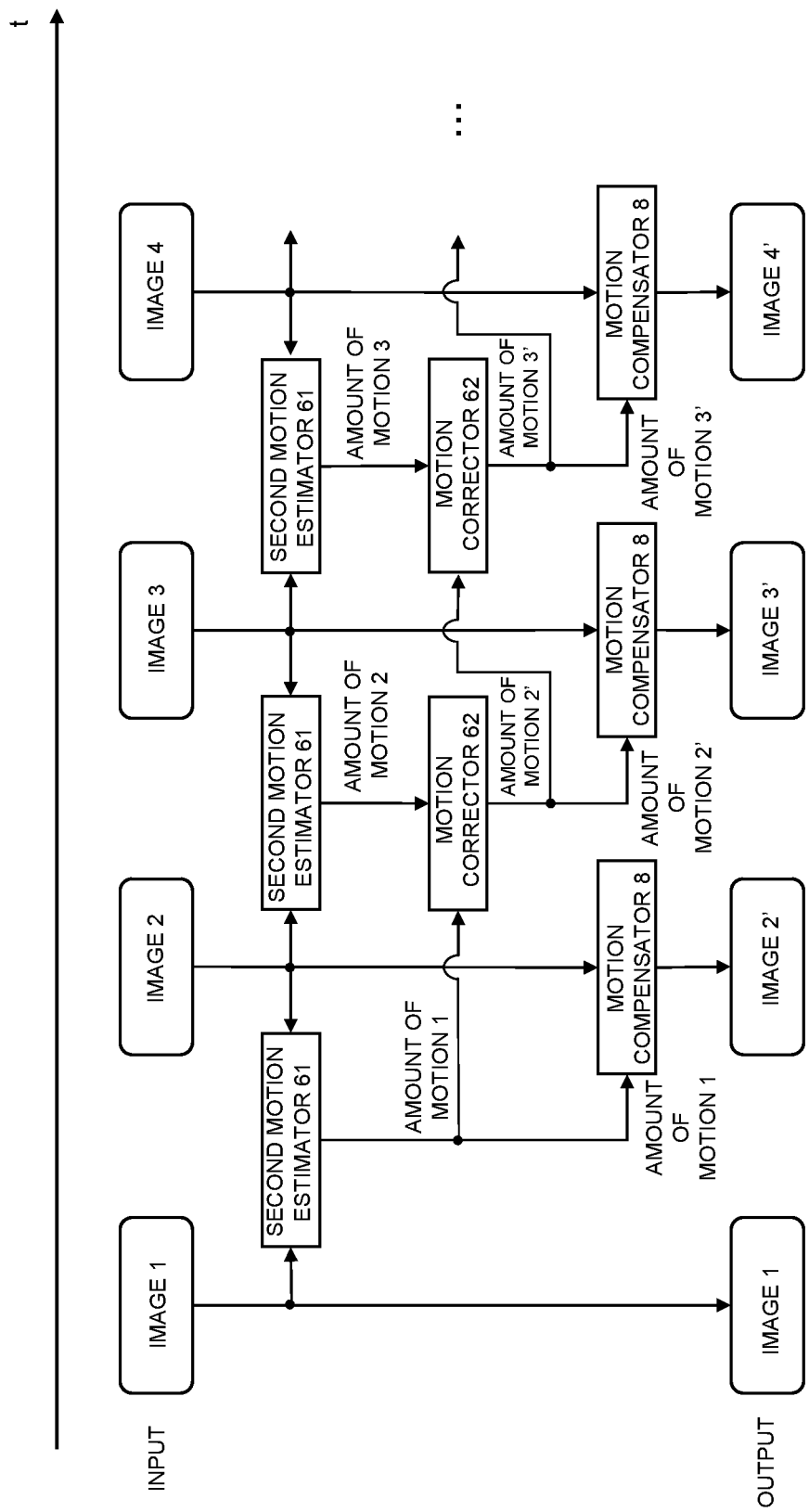
FIG. 8 is a diagram showing the basic concept of a global motion estimation mode (an example of a second estimation mode) according to one embodiment of the present invention.
Figure 10:
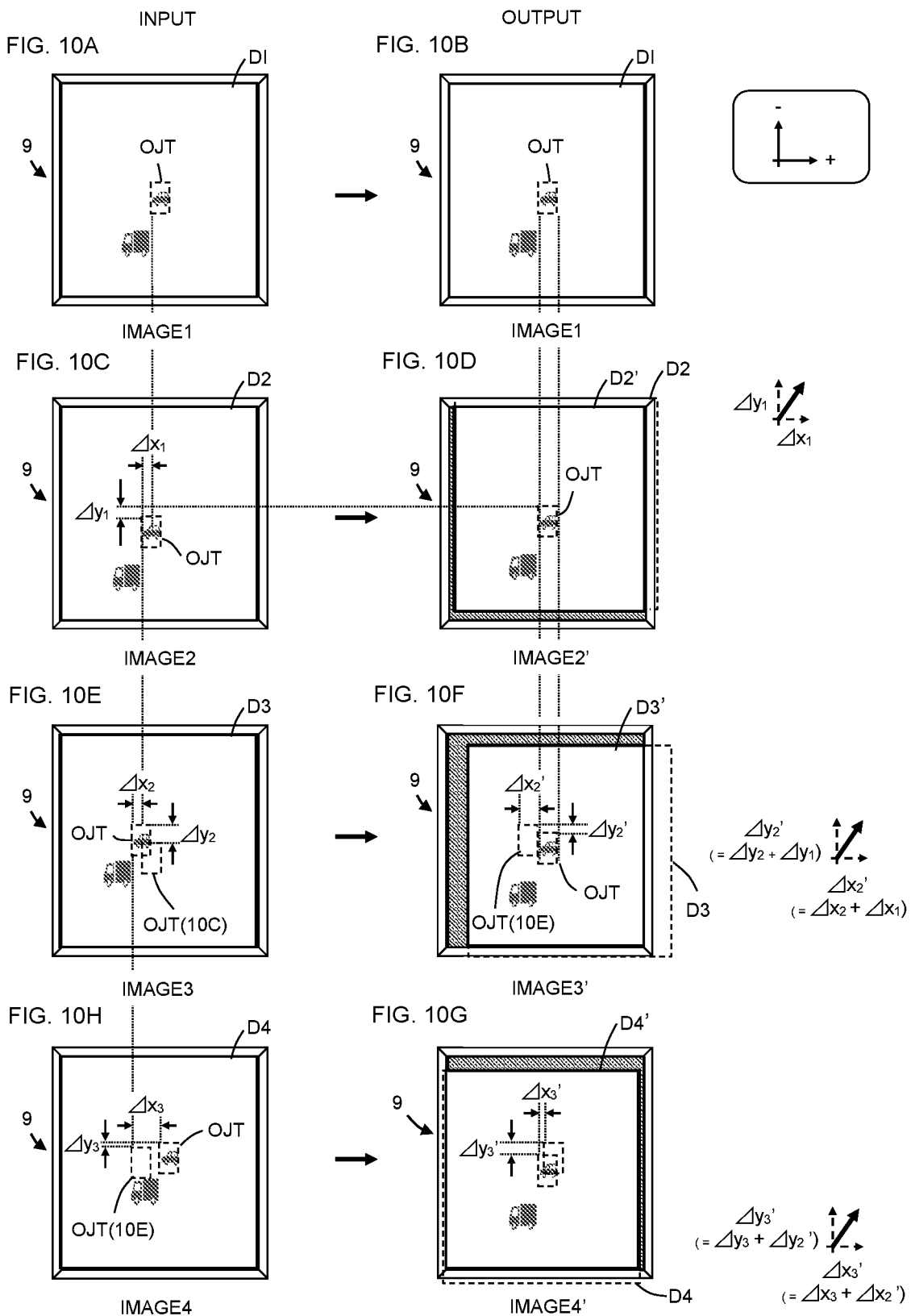
FIGS. 10A to 10H are conceptual diagrams showing an aspect in which the motion compensator 8 compensates for the position of an image in the global motion estimation mode so that an object is displayed in the approximate center of the display surface, in which a hatched portion represents an area where no image is displayed.

Referring now to FIGS. 8 to 10, the processes of S4 to S6, that is, the global motion estimation mode will be described.

S6: Global Motion Estimation Mode

The global motion estimation mode is a mode in which the amount of motion of the object is estimated from the entire first and second images. In the global motion estimation mode, the coordinates of the local area LA are not set unlike in the local motion estimation mode.

As shown in FIG. 9, the global motion estimation mode does not have the concept of the local area LA. For this reason, an entire image is divided into multiple areas (9 areas in FIG. 9), and the direction in which the entire image is moving is estimated. That is, in the global motion estimation mode, the entire image is regarded as an object whose motion is to be estimated, and the amount of motion of this object is estimated. In the first embodiment, description will be made using an example in which an image is divided into nine divided areas.

The second motion estimator 61 estimates the movement direction of each divided area using pattern matching or a feature vector. As used herein, the term "movement direction of each divided area" refers to the direction in which an object included in each divided area moves. While any estimation method may be used, a process similar to that with respect to the local area LA, for example, may be performed on each divided area. Specifically, the movement direction of each divided area can be estimated by setting the center of each divided area as a local area LA, setting the outer circumference of the divided area as a search area SA, and performing a process similar to tracking of the local area LA on each of the nine divided areas. The second motion estimator 61 shown in FIG. 2 then estimates the most common direction of the movement directions of the respective divided areas as the movement direction of the entire image. In an example of FIG. 9, the movement directions of six divided areas of the nine divided areas are an upper-right direction and therefore the entire image is estimated to be moving in the upper-right direction. The second motion estimator 61 then estimates the average of the amounts of motion of the respective divided areas considering the movement direction, as the amount of motion of the entire image. This amount of motion corresponds to the amount of global motion. Note that even if there is a divided area whose motion is difficult to estimate, the amount of motion of the entire image can be estimated by calculating the average of the areas except for that area.

The significance of the motion corrector 62 will be described below with reference to FIG. 10. In the global motion estimation mode, the coordinates of the local area LA are not set unlike in the local motion estimation mode. For this reason, the motion corrector 62 performs a correction process so that the motion compensator 8 properly performs a conversion process.

FIGS. 10A, 10C, 10E, and 10G show input images, and FIGS. 10B, 10D, 10F, and 10H show output images. In FIGS. 10A to 10H, an area corresponding to the local area LA in FIG. 7 is referred to as an object OJT for the convenience of description.

As shown in FIGS. 10A and 10B, also in the global motion estimation mode, a process similar to that in the local motion estimation mode is performed on the image 1.

As shown in FIG. 10C, assume that the amount of motion 1 of the image 2 with respect to the image 1 is ($\Delta$x1,$\Delta$y1). As shown in FIG. 8, the second motion estimator 61 outputs the amount of motion 1 ($\Delta$x1,$\Delta$y1) to the motion compensator 8 and motion corrector 62. As in the local motion estimation mode, the motion compensator 8 moves the image 2 along with D2 by the amount of motion 1 ($\Delta$x1, $\Delta$y1).

Next, as shown in FIG. 10E, assume that the amount of motion 2 of the image 3 with respect to the image 2 is ($\Delta$x2,$\Delta$y2). OJT (10C) in FIG. 10E represents the position of the object OJT in FIG. 10C.

In the global motion estimation mode, the coordinates of the local area LA are not set. For this reason, even if the motion compensator 8 moves the image 3 by the amount of global motion between the image 2 and image 3 in a conversion process, the image 3 is returned to the state of the image 2 shown in FIG. 10C. For this reason, in the global motion estimation mode, the second most recent amount of global motion, that is, the amount of global motion between the image 1 and image 2 is used. Thus, the display position of the object OJT in the image 3 can be approximately matched with the display position of the object OJT in the image 1. Specifically, the motion corrector 62 generates the corrected amount of motion 2' ($\Delta$x1'(=$\Delta$x2+$\Delta$x1),$\Delta$y1' (=$\Delta$y2+$\Delta$y1)) by adding the amount of motion 1 ($\Delta$x1,$\Delta$y1) as a correction amount to the amount of motion 2 ($\Delta$x2,$\Delta$y2). As shown in FIG. 8, the motion corrector 62 outputs the corrected amount of motion 2' ($\Delta$x1',$\Delta$y1') to the motion compensator 8.

The motion compensator 8 moves the image 3 along with D3 by the corrected amount of motion 2' ($\Delta$x1',$\Delta$y1'). In FIG. 10E, $\Delta$y2 is a negative value. This process is performed by adding the corrected amount of motion 2' to the coordinates of the entire image 3 and rendering the entire image 3. Thus, the motion compensator 8 generates an image 3' and outputs the image 3' as an output image subsequent to the image 2'. Note that ($\Delta$x2',$\Delta$y2') corresponds to the corrected amount of global motion in FIG. 2.

Next, as shown in FIG. 10G, assume that the amount of motion 3 of the image 4 with respect to the image 3 is (Δx3,Δy3). OJT (10E) in FIG. 10G represents the position of the object OJT in FIG. 10E. By using the corrected amount of motion 2', which is the second most recent amount of global motion, to perform a conversion process on the image 4, the display position of the object OJT in the image 4 can be approximately matched with the display position of the object OJT in the image 1. Specifically, the motion corrector 62 generates the corrected amount of motion 3' by adding the corrected amount of motion 2' (Δx2',Δy2') as a correction amount to the amount of motion 3 (Δx3,Δy3). Then, as shown in FIG. 8, the motion corrector 62 outputs the corrected amount of motion 3' (Δx3'(=Δx3+Δx2'),Δy3' (=Δy3+Δy2')) to the motion compensator 8.

The motion compensator 8 moves the image 4 along with D4 by the corrected amount of motion 3' (Δx3',Δy3'). This process is performed by adding the corrected amount of motion 3' to the coordinates of the entire image 4 and rendering the entire image 4. Thus, the motion compensator 8 generates an image 4' and outputs the image 4' as an output image subsequent to the image 3'. Note that (Δx3',Δy3') corresponds to the corrected amount of global motion in FIG. 2.

This process is performed each time one image is inputted until the input image of the last frame is inputted.

As seen above, in the global motion estimation mode, the amount of motion of the object is estimated from the entire image using pattern matching.

Referring back to FIG. 3, the description of the flow will be continued.

S7: Determine Whether Current Image is Image of Last Frame

After the motion compensator 8 completes the compensation process, it is determined in S7 whether the current image is the image of the last frame. When the determination result in S7 is "No", that is, the current image is not the image of the last frame, the processes of S2 to S5 are repeatedly performed. Even if the mode is switched to the global motion estimation mode in S6, the process returns to S2. As described above, this is because it is necessary to determine whether tracking of the local area LA has been allowed again. In this case, it can be said that the process of the local motion estimation mode is being performed in the background, although the local motion estimation mode has been switched to the global motion estimation mode. For this reason, when the predetermined criterion is not satisfied, the second estimation mode can be switched to the first estimation mode.

On the other hand, when the determination result in S7 is "Yes", that is, the current image is the image of the last frame, the image processing device 1 ends the vibration suppression process.

As described above, the image processing device 1 according to the first embodiment determines in which of the local motion estimation mode and global motion estimation mode the motion compensator 8 performs the conversion process, on the basis of the predetermined criterion. Thus, when tracking of the local area LA is allowed, the image processing device 1 is able to perform image processing in the local motion estimation mode, in which calculation is small in amount. On the other hand, when tracking of the local area LA is difficult, the local motion estimation mode is switched to the global motion estimation mode, in which the entire image is used. Thus, the image processing device 1 is able to efficiently suppress the vibration of the image while saving the calculation resources.

Second Embodiment

Next, referring to FIGS. 11 and 12, an image processing device 1 according to a second embodiment of the present invention will be described. A main difference between the second embodiment and first embodiment is that the global motion estimation mode is not used in the second embodiment.

The image processing device 1 according to the second embodiment includes a first motion estimator 41 that estimates the amount of motion of a local area LA in a predetermined search area SA and a motion compensator 8 that performs a conversion process on a second image so that the vibration of the local area LA between a first image and the second image is suppressed, on the basis of the amount of motion of the local area LA. The first motion estimator 41 has a first estimation mode in which the amount of motion of an image is estimated by tracking the local area LA in the search area SA and a second estimation mode in which the local area LA is tracked on the basis of a larger area than the search area SA in the first estimation mode.

Figure 11:
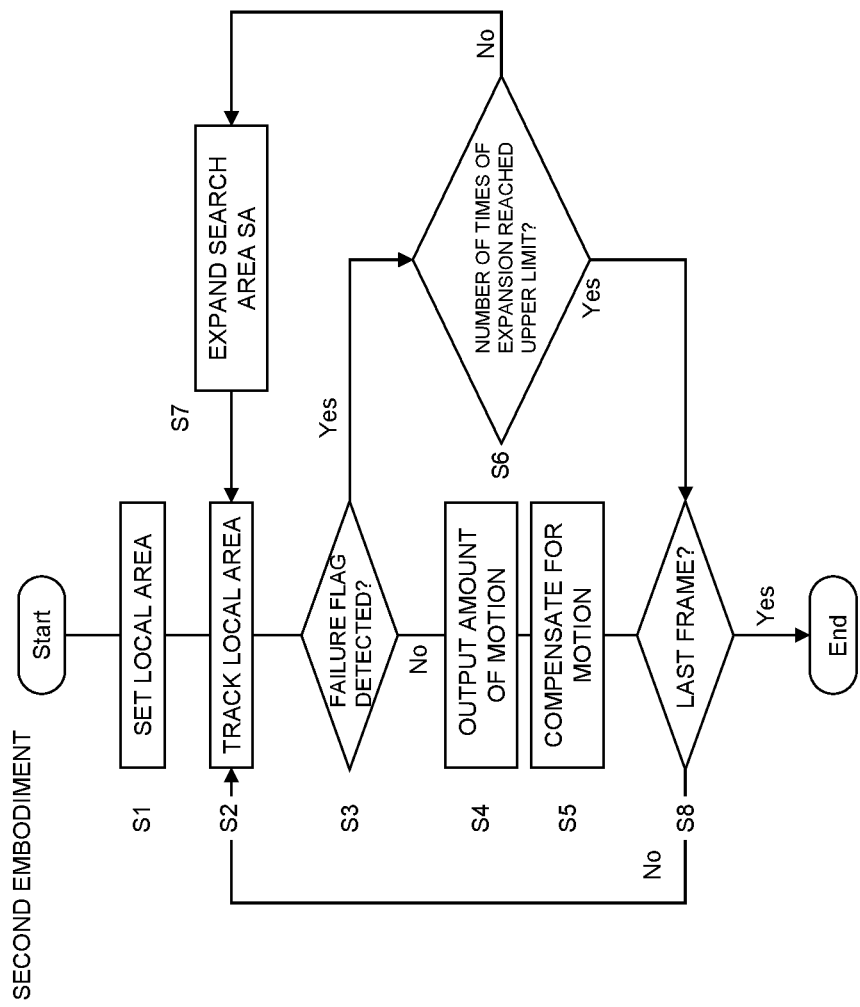
FIG. 11 is a flowchart showing an example of a process performed by an image processing device 1 according to a second embodiment of the present invention.
Figure 12:
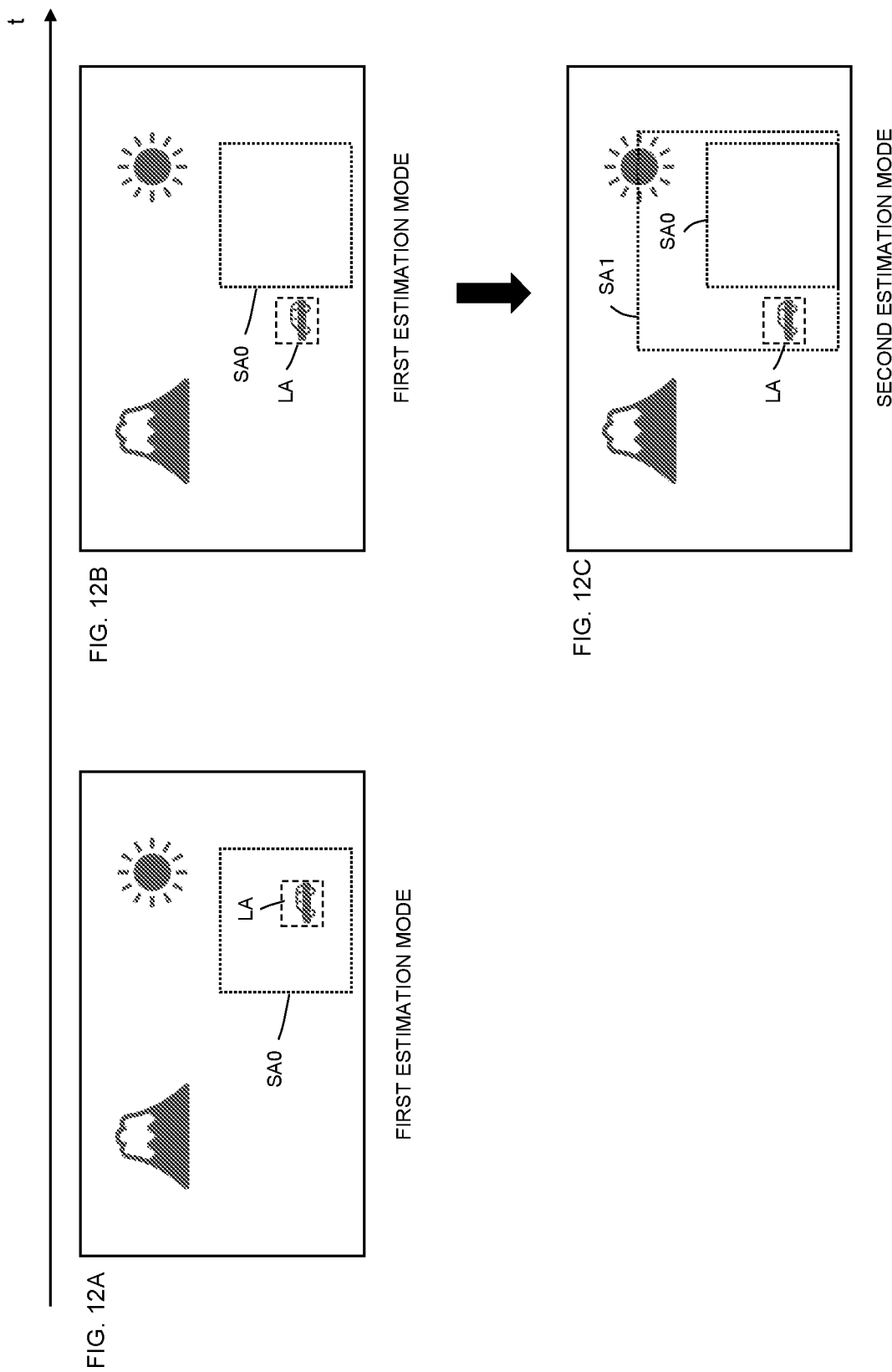
FIGS. 12A to 12C are conceptual diagrams showing an aspect in which the image processing device 1 according to the second embodiment of the present invention expands the size of a search area SA in the local motion estimation mode and thus a first estimation mode is switched to a second estimation mode (this process corresponds to S7 in FIG. 11).

As shown in FIGS. 11, S1 to S5 in the process flow of the second embodiment are similar to those in the first embodiment and therefore will not be described. S6 and S7 (the expansion of the search area SA) in FIG. 11 will be described below with reference to FIG. 12. Note that in FIG. 12, a number added to the search area SA represents the number of times of expansion of the search area SA. For example, a search area SA0 shown in FIG. 12A and 12B represents a yet-to-be-expanded search area SA (corresponding to the search area SA in the first embodiment). A search area SA1 shown in FIG. 12C represents a search area SA that has been expanded once.

A comparison is made between an input image shown in FIG. 12A and an input image of the subsequent frame shown in FIG. 12B. In the input image shown in FIG. 12B, the local area LA is located outside the search area SA0. In this case, the minimum value of the estimation error ($\Sigma|Y_0-Y_1|$) in the search area SA0 is increased, and a predetermined criterion shown in FIG. 5 is no longer satisfied. In other words, tracking of the local area LA becomes difficult.

For this reason, the local area tracking unit 4 newly sets a search area SA1 by expanding the search area SA0 using an area expander (not shown). This state is shown in FIG. 12C. That is, in the second embodiment, the local motion estimation mode after expanding the search area SA corresponds to the second estimation mode.

Then, the local area LA is tracked by again performing the process shown in FIGS. 4A to 4C. Note that the size and position of the search area SA1 is arbitrary and may be properly set so as to contain the SA0 in accordance with the characteristics of the image.

In the second embodiment, the search area SA0 is expanded, and the first estimation mode is switched to the second estimation mode. Thus, the local area LA which has been difficult to be tracked before being expanded can be tracked. If necessary, the search area SA may be expanded predetermined times repeatedly. If the size of the expanded search area SA becomes equal to the size of the entire image, the local area LA can be tracked accurately as long as the local area LA is located in the image, although calculation is large in amount.

Next, referring to FIG. 11, a process flow according to the second embodiment will be described. As shown in FIG. 11, S1 to S5 in the process flow of the second embodiment are similar to those in the first embodiment and therefore will not be described.

Then, in S3, the tracking failure detector 5 determines whether a failure flag has been detected. When the determination result in S3 is "No", that is, when no failure flag has been detected, the process proceeds to S5.

Then, in S5, the local area tracking unit 4 outputs the amount of motion to the motion compensator 8. Then, in S6, the motion compensator 8 performs a conversion process. On the other hand, when the determination result in S3 is "Yes", that is, a failure flag has been detected, the process proceeds to S6 to determine whether the number of times of expansion of the search area SA has reached the upper limit. Note that the upper limit number of times may be any number of times. Hereinafter, an example in which the upper limit number of times is three will be described.

In the initial state, the number of times of expansion is zero and does not exceed the upper limit. Therefore, the determination result in S6 becomes "No". Then, the process proceeds to S7, and the local area tracking unit 4 sets a search area SA1 by expanding the search area SA0. Then, the process again proceeds to S3 through S2. When tracking of the local area LA is allowed due to the setting of the search area SA1, the process proceeds to S4. On the other hand, when tracking of the local area LA is still difficult although the search area SA1 has been set, that is, when the predetermined criterion shown in FIG. 5 is satisfied, the process again proceeds to S6. This process is repeatedly performed until the number of times of expansion of the search area SA exceeds the upper limit.

When the number of times of expansion exceeds the upper limit in S6, specifically, when tracking of the local area LA is difficult although a search area SA3 has been set, the determination result in S6 becomes "Yes", and the process proceeds to S8. That is, when tracking of the local area LA is difficult although the search area SA has been expanded until the number of times of expansion exceeds the upper limit, the image is displayed as it is without performing a compensation process. In the present embodiment, the upper limit number of times of expansion of the search area SA is set to three. However, if the size of the search area SA3 that has been expanded three times is set so as to be equal to the size of the entire image, the process proceeds to S4 after the upper limit number of times is exceeded in S6, and a compensation process can be performed.

Then, the process proceeds to S8, and a process similar to S7 in FIG. 3 related to the first embodiment is performed.

When the determination result in S8 is "Yes", that is, the current image is the image of the last frame, the image processing device 1 ends the vibration suppression process.

As described above, the local area LA can be accurately tracked by expanding the search area SA using the above configuration and process. Thus, it is possible to efficiently suppress the vibration of the image while saving the calculation resources.

When the predetermined criterion is no longer satisfied in the second estimation mode, for example, when the local area LA departs from the search area SA2 and is located in the immediately preceding search area SA1, tracking of the local area LA may be allowed in the search area SA1. In this case, the mode switch 7 may reduce the size of the search area SA by one level so that the local area LA is tracked. Also, when the local area LA is located in the initial search area SA, the second estimation mode may be switched to the first estimation mode.

Third Embodiment

Figure 13:
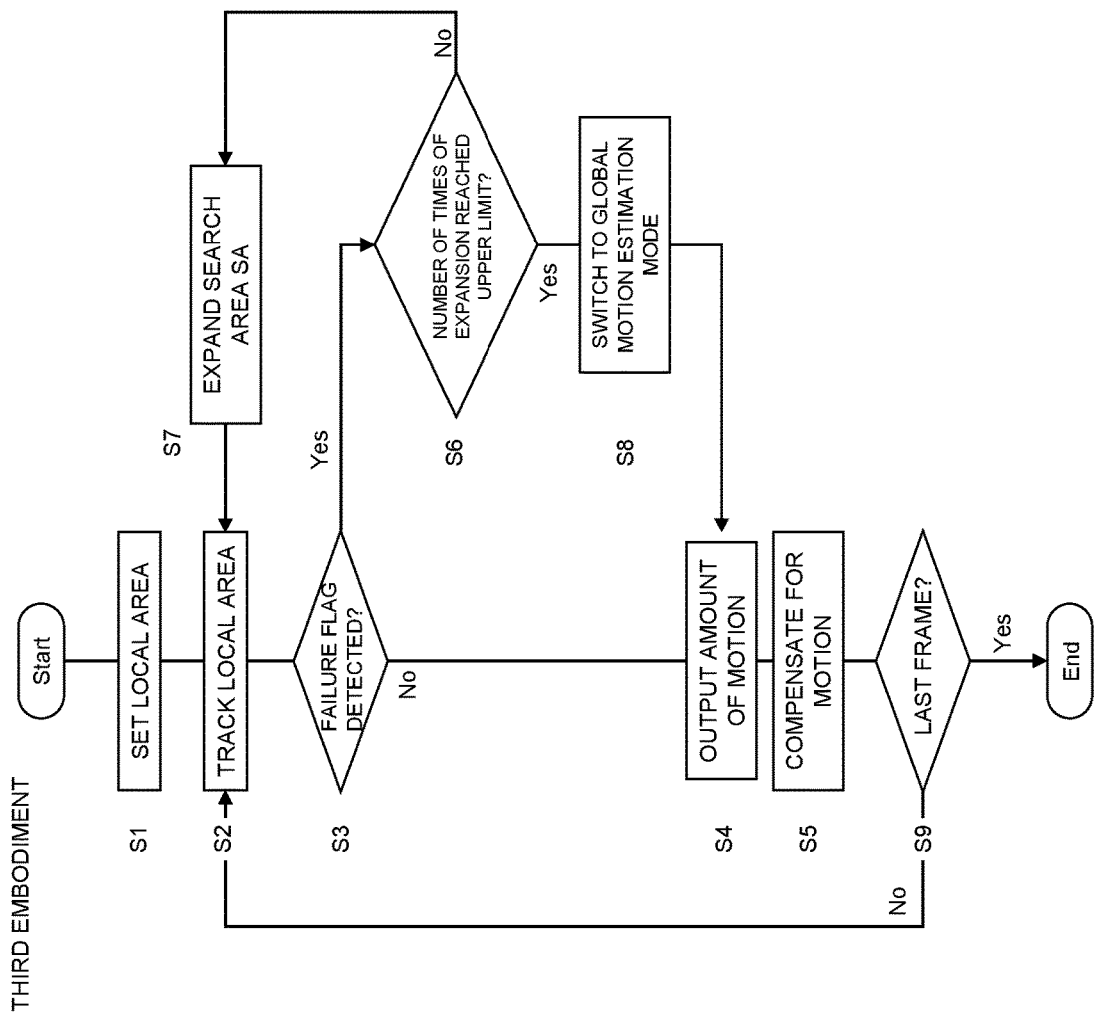
FIG. 13 is a flowchart showing an example of a process performed by an image processing device 1 according to a third embodiment of the present invention.

Next, referring to FIG. 13, an image processing device 1 according to a third embodiment of the present invention will be described. The image processing device 1 according to the third embodiment performs a process obtained by combining the processes of the first and second embodiments. S1 to S7 in FIG. 13 are similar to those in the second embodiment and therefore will not be described.

In the third embodiment, when the upper limit number of times is exceeded in S6, specifically, when tracking of the local area LA is difficult although a search area SA3 has been set, the determination result in S6 becomes "Yes", and the process proceeds to S8. In S8, the mode is switched to the global motion estimation mode, as in the S6 of FIG. 3 related to the first embodiment.

Then, the process proceeds to S5 and S9 through S4, and a process similar to S7 of FIG. 3 related to the first embodiment is performed.

On the other hand, when the determination result in S9 is "Yes", that is, the current image is the image of the last frame, the image processing device 1 ends the vibration suppression process.

As described above, the image processing device 1 according to the third embodiment is able to accurately track the local area LA by expanding the search area SA. Even when the number of times of expansion of the search area SA exceeds the upper limit, the motion compensator 8 can continue the conversion process by switching the mode to the global motion estimation mode.

Others

While the various embodiments have been described, the image processing device 1 according to the present invention is not limited thereto. For example, the criterion for switching between the first estimation mode and the second estimation mode may be a single criterion that "the estimation error exceeds the predetermined value." Alternately, the criterion may be a single criterion that "the estimation error exceeds the predetermined multiple of the average value." Also, the threshold shown in FIG. 5 may be dynamically changed in accordance with a variation in the amount of motion of the image. For example, when the amount of motion of the image becomes equal to or greater than the predetermined value multiple times continuously, the threshold may be increased. In this case, the accuracy with which the local area LA is tracked is improved even if the average value is not used as the predetermined criterion.

The mode switch 7 may be omitted. In this case, the local motion estimation mode and global motion estimation mode may be performed simultaneously, and the motion compensator 8 may make a selection on whether it should perform the conversion process on the basis of the amount of motion estimated in the local motion estimation mode or on the basis of the amount of motion estimated in the global motion estimation mode.

When estimating the amount of motion in the local motion estimation mode and global motion estimation mode, a feature vector may be used in place of pattern matching.

The image processing apparatus 1 may be provided as a PC, a server or computer, or a set-top box connected to a display device. The image processing device 1 may be incorporated into a display device. The image processing device 1 may also be provided as a computer-readable non-transitory storage medium having the functions of the image processing device 1 implemented thereon. A program for implementing the functions of the image processing apparatus 1 may be distributed through the internet or the like.

The elements of the image processing device 1 may be contained in the same case, or may be disposed in multiple cases in a distributed manner.

DESCRIPTION OF REFERENCE SIGNS

1: image processing device
2: motion estimator
3: area setter
4: local area tracking unit
41: first motion estimator
42: image cutter
5: tracking failure detector
6: global motion estimator
61: second motion estimator
62: motion corrector
7: mode switch
8: motion compensator
9: image display device
LA: local area
SA: search area
FA: fitting area

The invention claimed is:

1. An image processing device comprising:
 a motion estimating circuit configured to estimate the amount of motion of an object between a first image and a second image later than the first image;
 a motion compensating circuit configured to perform a conversion process on the second image so that vibration of the object between the first image and the second image is suppressed, on the basis of the amount of motion of the object; and
 a mode switching circuit configured to switch between a first estimation mode and a second estimation mode, wherein
 the motion estimating circuit has the first estimation mode in which the amount of motion of the object is estimated in a predetermined search area and the second estimation mode in which the amount of motion of the object is estimated in a larger area than the predetermined search area in the first estimation mode,
 when a predetermined criterion is satisfied, the motion compensating circuit performs the conversion process on the basis of the amount of motion estimated in the second estimation mode, and
  the predetermined search area of the first estimation mode is in the first image and is smaller than the first image,
  the larger area of the second estimation mode is in the first image and includes the predetermined search area of the first estimation mode, and
 when the predetermined criterion is not satisfied, the motion compensating circuit performs the conversion process on the basis of the amount of motion estimated in the first estimation mode,
 in the first estimation mode, the motion estimating circuit defines, as an estimation error, a value calculated on the basis of a difference in luminance between the object included in the first image and a predetermined area included in the second image, and
 the predetermined criterion is that the estimation error exceeds a predetermined value, or that the estimation error exceeds a predetermined multiple of an average value, or both.

2. The image processing device of claim 1, wherein the second estimation mode is a global motion estimation mode in which the amount of motion of the object is estimated from the entire first and second images.

3. The image processing device of claim 1, wherein in the second estimation mode, the amount of motion of the object is estimated in a new search area obtained by expanding a size of the search area in the first estimation mode.

4. The image processing device of claim 1, wherein the motion estimator estimates the amount of motion of the object using pattern matching or a feature vector.

5. The image processing device of claim 1, further comprising:
 an area setting circuit configured to set an area corresponding to the object in the first estimation mode.

6. The image processing device of claim 5, wherein the motion compensating circuit performs the conversion process on the second image so that the area set by the area setting circuit is located in an approximate center of a display surface on which the first and second images are displayed.

7. The image processing device of claim 1, wherein when the predetermined criterion is not satisfied, the mode switching circuit switches the second estimation mode to the first estimation mode.

8. An image display device comprising the image processing device of claim 1.

9. An image processing program for causing a computer to function as:
 a motion estimating circuit configured to estimate the amount of motion of an object between a first image and a second image later than the first image;
 a motion compensating circuit configured to perform a conversion process on the second image so that vibration of the object between the first image and the second image is suppressed, on the basis of the amount of motion of the object; and
 a mode switching circuit configured to switch between a first estimation mode and a second estimation mode, wherein
 the image processing program is stored in a computer-readable non-transitory storage medium,
 the motion estimating circuit has the first estimation mode in which the amount of motion of the object is estimated in a predetermined search area and the second estimation mode in which the amount of motion of the object is estimated in a larger area than the predetermined search area in the first estimation mode,
 when a predetermined criterion is satisfied, the motion compensating circuit performs the conversion process on the basis of the amount of motion estimated in the second estimation mode, and
  the predetermined search area of the first estimation mode is in the first image and is smaller than the first image,
  the larger area of the second estimation mode is in the first image and includes the predetermined search area of the first estimation mode, and
 when the predetermined criterion is not satisfied, the motion compensating circuit performs the conversion process on the basis of the amount of motion estimated in the first estimation mode,
 in the first estimation mode, the motion estimating circuit defines, as an estimation error, a value calculated on the basis of a difference in luminance between the object included in the first image and a predetermined area included in the second image, and the predetermined criterion is that the estimation error exceeds a predetermined value, or that the estimation error exceeds a predetermined multiple of an average value, or both.

10. An image processing device comprising:
a motion estimating circuit configured to estimate the amount of motion of an object between a first image and a second image later than the first image; and
a motion compensating circuit configured to perform a conversion process on the second image so that vibration of the object between the first image and the second image is suppressed, on the basis of the amount of motion of the object, wherein
the motion estimating circuit has a first estimation mode in which the amount of motion of the object is estimated in a predetermined search area and a second estimation mode in which the amount of motion of the object is estimated in a larger area than the predetermined search area in the first estimation mode,
the predetermined search area of the first estimation mode is in the first image and is smaller than the first image,
the second estimation mode is a global motion estimation mode, and the larger area of the global motion estimation mode match with the entire first image,
in the global motion estimation mode, the larger area than the predetermined search area is divided into a plurality of divided areas, and movement direction is estimated for each divided area, and the amount of motion of the object is estimated from the movement directions of the divided areas,
when a predetermined criterion is satisfied, the motion compensating circuit performs the conversion process on the basis of the amount of motion estimated in the second estimation mode, and
when the predetermined criterion is not satisfied, the motion compensating circuit performs the conversion process on the basis of the amount of motion estimated in the first estimation mode.

* * * * *